Oct. 11, 1966 KURANDO OGATA 3,278,870

INDUCTANCE DEVICE FOR RADIO COMMUNICATION

Filed Nov. 4, 1964

2 Sheets-Sheet 1

INDUCTANCE DEVICE FOR RADIO COMMUNICATION

Filed Nov. 4, 1964

United States Patent Office 3,278,870

Patented Oct. 11, 1966

3,278,870
INDUCTANCE DEVICE FOR RADIO COMMUNICATION

Kurando Ogata, 1562—54 Tsuda-machi, Tokyo, Japan

Filed Nov. 4, 1964, Ser. No. 408,947
Claims priority, application Japan, Nov. 16, 1963, 38/86,275; Sept. 15, 1964, 39/73,478
3 Claims. (Cl. 334—41)

This invention relates to an inductance device for radio communication which is provided with inductance coils as lumped or concentrated circuit elements, and in particular to an inductance device for radio communication which is highly suitable for use in tuners for the entire frequencies from LHF to UHF bands.

That is, in the present invention a plurality of inductance coils are so designed as to be changed over and lead wires of the respective change-over positions of the inductance coils can be utilized as distributed constant tuning elements.

Tuners of rotary and turret systems have heretofore been put to practical use as inductance devices for radio communication. However, such prior art devices possess many disadvantages in practical use. That is, in the rotary system lead wires from inductance coils to a switch mechanism are inevitably required to be long and high selectivity cannot be obtained due to an increase in stray capacity, and hence tuners for high frequencies, for example, the UHF band, cannot be obtained. In the turret system, since coils are rotated to be changed over, they are subjected to shock conditions thereby to cause variations in the tuning constant of the coils. Accordingly, it is very difficult to maintain an oscillating coil stable at all times and in addition tuners according to the turret system are very expensive to manufacture. These disadvantages are exactly the same with a disc-turret system heretofore employed.

The principal object of the present invention is to provide an improved inductance device for radio communication which is free from the foregoing disadvantages experienced in the conventional devices.

Other objects, features and advantages of the present invention will be apparent from the following description taken in conjunction with the accompanying drawings, in which.

Figure 1:
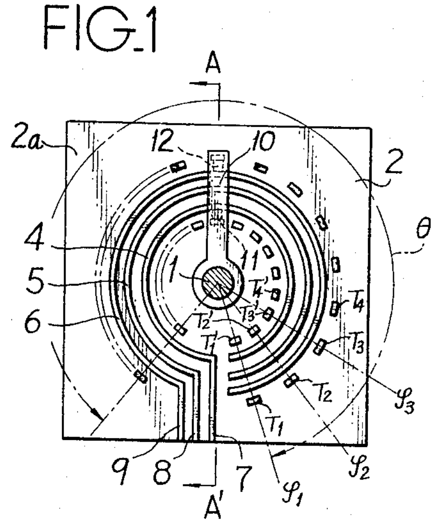
FIGURE 1 is a front view illustrating an example of the inductance device according to this invention.

Referring now to the drawing, the present invention will hereinafter be explained in detail.

Figure 2:
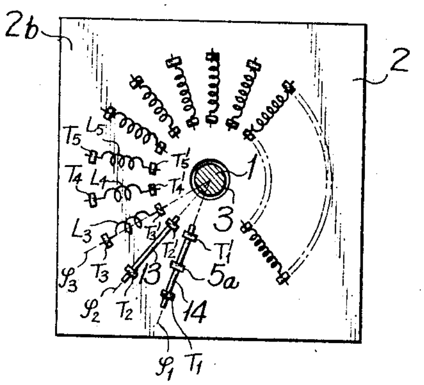
FIGURE 2 is a back view of the device shown in FIGURE 1.
Figure 3:
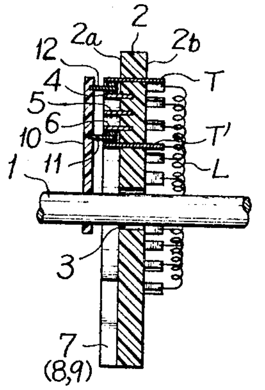
FIGURE 3 is a cross-sectional view seen along the A–A′ line in FIGURE 1.
Figure 4:
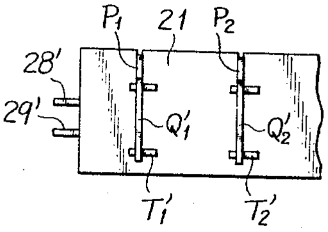
FIGURE 4 is a front view illustrating another example of this invention.

In FIGURES 1 to 3, 1 is a rotary shaft and 2 is an insulating base plate having the rotary shaft 1 loosely inserted thereinto. On one surface 2*a* of the insulating plate 2, there are provided three conductors 4, 5 and 6 substantially concentrically over a range of a desired rotary angle $\theta$ about a hole 3 into which the rotary shaft 1 has been loosely inserted. Terminals 7, 8 and 9 are provided at each end of the conductors. In this case, the conductors 4, 5 and 6 are long and narrow metal plates rectangular in cross-section and planted substantially at right angles with respect to the surface of the base plate 2. Projecting on the both surfaces of the insulating base plate 2 are a plurality of conductor pieces $T_1$, $T_2$, $T_3$ . . . and $T_1'$, $T_2'$, $T_3'$ . . ., which are planted substantially at equiangular intervals over the range of the rotary angle $\theta$. As is best seen in FIGURES 1 and 3, the conductor pieces $T_1$, $T_2$, $T_3$ . . . and $T_1'$, $T_2'$, $T_3'$ . . . are positioned respectively outside of the conductor 6 and inside of the conductor 4 concentrically about the hole 3 for the rotary shaft 1, the conductors $T_1$ and $T_1'$, $T_2$ and $T_2'$, $T_3$ and $T_3'$ . . . forming pairs respectively.

Mounted on the rotary shaft 1 is an insulating rotary member 10, on the free end of which a pair of short-circuit contact pieces 11 and 12 are provided. In response to the rotation of the rotary shaft 1, the short-circuit contact pieces 11 and 12 are moved into contact with the aforementioned conductors 4 and 6 and simultaneously make contact with the pairs of the conductor pieces $T_1$ and $T_1'$, $T_2$ and $T_2'$, $T_3$ and $T_3'$ . . . respectively at the positions of rotary angles $\varphi_1$, $\varphi_2$, $\varphi_3$, $\varphi_4$ . . . such as shown in FIGURE 1.

On the surface 2*b* of the base plate 2, inductance coils $L_3$, $L_4$, $L_5$ . . . are connected as lumped or concentrated constants respectively between the twin conductor pieces $T_3$ and $T_3'$, $T_4$ and $T_4'$, $T_5$ and $T_5'$ . . . other than two pairs of the conductor pieces, for example, $T_1$ and $T_1'$ and $T_2$ and $T_2'$. Furthermore, in advance one pair of the conductor pieces $T_2$ and $T_2'$ are short-circuited by means of a short-circuit piece 13 and the other pair of the conductor pieces $T_1$ and $T_1'$ are coupled with the conductor 5. For this coupling, one portion of the conductor 5 is projected on the surface 2*b* of the base plate 2 at a position corresponding to the conductor pieces $T_1$ and $T_1'$, and the output end 5*a* of the conductor 5 and the conductor pieces $T_1$ and $T_1'$ are short-circuited by means of a short-circuit piece 14.

Since the device of the present invention is of such a structure as has been described in the foregoing, the inductance coils $L_3$, $L_4$, $L_5$ . . . can be selected as desired with the short-circuit contact pieces 11 and 12 by turning the rotary shaft 1. The selected coil is led out to the terminals 7 and 9 through the conductors 4 and 6.

Where the short-circuit contact pieces 11 and 12 stay at the position of the conductor pieces $T_2$ and $T_2'$, a distributed constant circuit element can be formed such that the terminals of the conductors 4 and 6 are short-circuited by the short-circuit piece 13 with respect to the terminals 7 and 9, since no inductance coil has been connected to the conductor pieces $T_2$ and $T_2'$. Thus, according to the present invention such conductors can be made use of as twin-lead type or terminal short-circuit type Lecher wires. In addition, the conductors can be employed as terminal-open type Lecher wires or a coaxial type tuning element with respect to the terminal 7 or the terminals 9 and 8.

When the insulating rotary member 10 stays at the position of the conductor pieces $T_1$ and $T_1'$, the conductors can be made use of as a coaxial type tuning element of terminal short-circuit type.

Therefore, a variable tuning circuit can be constituted which has the conductors 4, 5 and 6 as distributed constant type tuning elements by connecting, for example, a variable tuning capacitor, between the terminals 7 and 9, 7 and 8, 8 and 9, 7, 8 and 9 or 8 and 7, 9.

In accordance with the present invention, the inductance coils or the conductors used as their lead wires can be utilized as the distributed constant type tuning elements according to the working frequency, as has previously been described. Thus, the inductance device of the present invention is extremely suitable for use in tuners for all the frequencies lower than the UHF band.

The foregoing explanation on FIGURES 1 to 3, inclusive, has been made in connection with an example in which the three conductors 4, 5 and 6 were employed. However, it will be easily seen that a distributed constant element can be formed between the conductors 4 and 6 without necessitating the provision of the conductor 5.

Referring to FIGURES 4 to 8, another example of the device according to the present invention will hereinbelow be explained.

In the figures the reference numeral 21 designates an insulating base plate, on one surface *a* of which at least two strips of conductors, in the illustrated example three strips of conductors 22, 23 and 24 are planted perpendicularly to the surface *a* of the insulating base plate 21 and in parallel to one another. The conductors 22 and 24 are arranged in such a manner that their respective ends may project out from the surface *a* of the insulating base plate 21, while the conductor 23 is arranged in such a manner that its end may be on the same plane as the surface *a* and that one portion 23' of the conductor 23 may project out to the other surface *b* of the base plate 21. This is indicated at the numeral reference 23' in FIGURE 6.

Then, a pair of conductor pieces $T_1$ and $T_1'$ are planted on the aforementioned insulating base plate 21. At this time, the conductor pieces $T_1$ and $T_1'$ are placed in a manner such that their ends may be on the same plane as the conductors 22 and 24 for the sake of convenience, and further the conductor pieces $T_1$ and $T_1'$ are positioned to confront each other in the vertical direction. That is, the conductor pieces $T_1$ and $T_1'$ are disposed respectively above the conductor 22 and below the conductor 24. In like manner, other conductor pieces $T_2$ and $T_2'$, $T_3$ and $T_3'$ . . . are placed at equal intervals. Furthermore, the conductor pieces $T_1$ and $T_1'$, $T_2$ and $T_2'$, $T_3$ and $T_2'$ . . . are arranged in such a manner that their other ends may project out to the surface *b* of the base plate 21 and that these ends may be on the same plane for convenience's sake.

$S_1$, $S_2$, $S_3$ . . . are longitudinal grooves, which are formed by cutting upper marginal portions of the insulating base plate 21 respectively above the conductor pieces $T_1$, $T_2$, $T_3$ . . . 31 and 32 are short-circuit conductors, the former 31 being connected to the conductor pieces $T_1$ and $T_1'$ and the portion 23' of the conductor 23 and the latter 32 being connected to the conductor pieces $T_2$ and $T_2'$. $L_3$ and $L_4$ . . . are inductances, the inductance $L_3$ being connected to the conductor pieces $T_3$ and $T_3'$ and the inductance $L_4$ being connected to the conductor pieces $T_4$ and $T_4'$ . . . .

$P_1$, $P_2$ . . . are push-button associating rods. These push-button associating rods are bridge-shaped, each having projections $Q_1$ and $Q_1'$ on either side thereof. On the inside of these projections $Q_1$ and $Q_1'$, short-circuit contact pieces 25, 26 and 27 are provided. The contact piece 25 is provided for short-circuiting the conductor pieces $T_1$ and $T_1'$, and the contact piece 26 is to connect the conductor piece $T_1$ and the conductor 22 and further the remaining contact piece 27 is to connect the conductor 24 and the conductor piece $T_1'$. The bodies $P_1'$, $P_2'$ . . . of the aforementioned push-button associating rods $P_1$, $P_2$ . . . are inserted respectively into the longitudinal grooves $S_1$, $S_2$ . . . and the associating rods are pushed to move forward and backward individually. 28, 28', 29, 29' and 30 are terminals provided respectively at the both ends of the aforesaid conductors 22 and 24 and at one end of the conductor 23.

Operations of the device of the present invention will hereinbelow be explained.

Figure 7A:
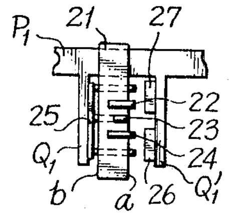
FIGURES 7A and 7B are left-hand side views of the insulating base plate shown in FIGURES 5 and 6, respectively illustrating inoperative and operative conditions of the device according to this invention.
Figure 7B:
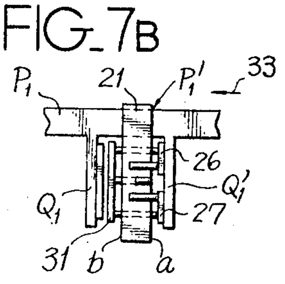

FIGURES 7A and 7B respectively illustrate inoperative and operative conditions of a distributed constant tuning element according to this invention.

Figure 8A:
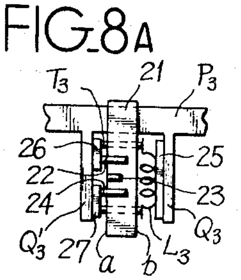
FIGURES 8A and 8B are right-hand side views of the insulating base plate shown in FIGURES 5 and 6, respectively illustrating inoperative and operative conditions of the device.
Figure 8B:
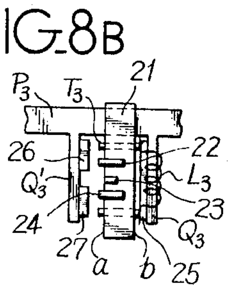
Figure 9:
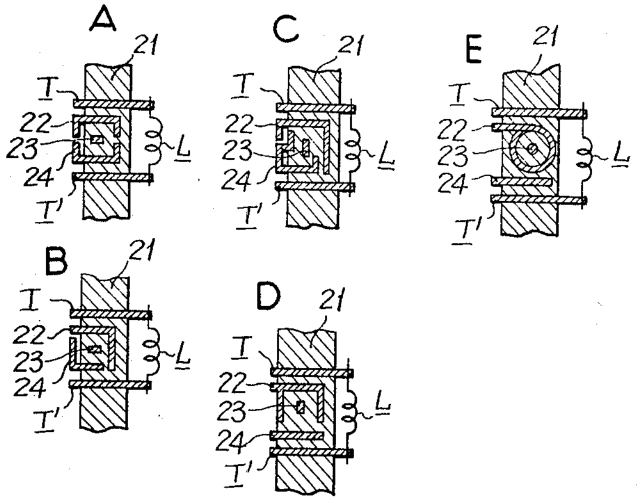
FIGURES 9A to 9E, inclusive, illustrate other examples of this invention.

FIGURES 8A and 8B respectively illustrate inoperative and operative conditions of a lumped or concentrated constant tuning element according to this invention. The device of this invention is normally in such a condition that the short-circuit conductors 31 and 32 connected to the pairs of the conductor pieces $T_1$ and $T_1'$, $T_2$ and $T_2'$, $T_3$ and $T_3'$ . . . and the terminals having the inductance coils $L_3$, $L_4$ . . . connected thereto are all short-circuited as illustrated in FIGURES 7A and 8B. In such a case, when the push-button associating rod $P_1$ in the groove $S_1$ is moved in the direction of the arrow 33 as shown in FIGURE 7B, the short-circuit contact pieces 26 and 27 mounted on the projection $Q_1'$ of the push-button associating rod $P_1$ conduct the conductor pieces $T_1$ and $T_1'$ through the contact pieces 26 and 27. The three conductors 22, 23 and 24 in the above operative condition are short-circuited at the position of the end 23' of the conductor 23 and, with respect to the terminals 28, 29 and 30, these three conductors function as a coaxial resonator of terminal short-circuit type. Furthermore, when the conductor pieces $T_2$ and $T_2'$ are likewise short-circuited by the action of the push-button associating rod $P_2$ in the groove $S_2$, the conductors 22 and 23 serve as twin-lead type Lecher wires of terminal short-circuit type with respect to the terminals 28 and 29, and the central conductor 23 tunes to a wavelength of ½λ (λ: wavelength) as a terminal-open type coaxial tuner with respect to the terminals 28, 29 and 30.

When the push-button associating rod $P_3$ in the third groove $S_3$ is moved similarly as illustrated in FIGURE 8A, the inductance $L_3$ connected to the conductor pieces $T_3$ and $T_3'$ is connected to the conductors 22 and 24 by the shirt-circuit contact pieces 26 and 27 mounted on the projection $Q_3'$, and the terminals 28' and 29' or 28 and 29 of the conductors 22 and 24 can be used as output terminals of the inductance $L_3$.

Figure 5:
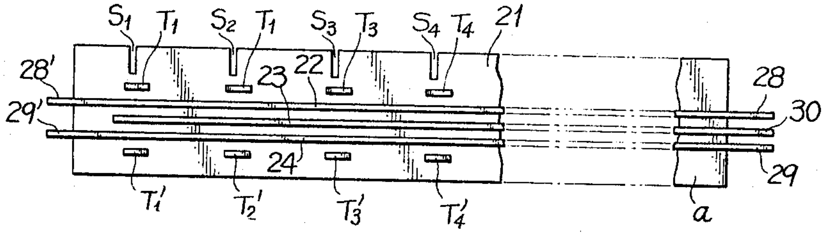
FIGURE 5 is a front view of one side of an insulating base plate.
Figure 6:
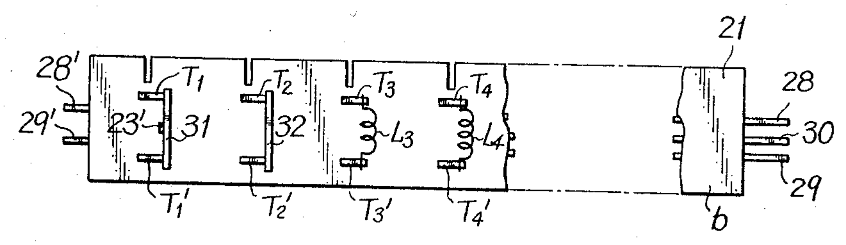
FIGURE 6 is also a front view of the other side of the insulating base plate shown in FIGURE 5.

As has been described in the foregoing, where the conductors are operated as a coaxial type tuner or a Lecher wire type tuner the device of this invention can be used for frequencies of the UHF band for the sake of convenience and where the conductors 22 and 23 are used as lead wires, the device can be employed for frequency bands lower than the VHF one. However, the nature and performance of an amplifier for the UHF band naturally differ from those of an amplifier for the frequency bands lower than the VHF one, and hence it is impossible to use an amplifier in common for all the frequency bands. Accordingly, in the present invention an amplifier for the frequency bands lower than the VHF band is connected to the terminals 28' and 29', while an amplifier for the UHF band is connected to the terminals 28, 29 and 30 as illustrated in FIGURES 5 and 6 respectively. With such an arrangement, frequencies for the LHF band to the UHF band can suitably be separated and amplified. This is an important advantage of this invention. In the above example, the conductors 22 and 24 are rectangular in cross-section. However, it will be easily seen that even if the shape of the conductors 22, 23 and 24 is changed as illustrated in FIGURES 9A to 9E, they work in exactly the same manner as in the foregoing example. In order that one portion 23' for the conductor 23 may be provided when the conductors are of such configuration as shown in FIGURES 9B to 9E, a hole is made at one portion of the conductor 22, through which the conductor 23 is led out.

It will be apparent that many modifications and variations may be effected without departing from the scope of the novel concept of this invention.

What is claimed is:

1. An inductance device for radio communication comprising an insulating base plate, at least two strips of conductors provided on one surface of said insulating base plate, said two conductors being spaced from each other at equal intervals and projecting from the surface of said base plate, terminals provided at each one end of said two conductors, a plurality of pairs of conductor pieces provided outside and inside of said two conductors and projecting from the both surfaces of said insulating base plate, said conductor pieces being insulated from said two conductors respectively, a plurality of short-circuit pieces connected to each pair of said conductor pieces, inductance coils connected to each pair of said conductor pieces, and a brush provided with two short-circuit contact pieces for connecting said conductor pieces and the conductors adjacent thereto.

2. An inductance device for radio communication comprising an insulating plate, at least two strips of conductors provided concentrically on one surface of said insulating base plate, said two conductors being spaced from each other at equal intervals and projecting from the surface of said base plate, terminals provided at each one end of said two conductors, a plurality of pairs of conductor pieces provided outside and inside of said two conductors and projecting from the both surfaces of said insulating base plate, said conductor pieces being insulated from said two conductors respectively, at least one short-circuit piece connected to each pair of said conductor pieces, inductance coils connected to each pair of said conductor pieces, an insulating rotary member rotatably provided in the center of said conductors disposed concentrically on the base plate, and two short-circuit contact pieces mounted on said insulating rotary member, said short-circuit contact pieces being respectively rotated to connect the conductor pieces and the conductors adjacent thereto.

3. An inductance device for radio communication comprising an insulating base plate, at least two strips of conductors provided in parallel on one surface of said insulating base plate, said two conductors being spaced from each other at equal intervals and projecting from the surface of said base plate, terminals provided at each one end of said two conductors, a plurality of pairs of conductor pieces provided outside and inside of said two conductors, at least one short-circuit piece connected to each pair of said conductor pieces, a plurality of inductance coils connected to each pair of said conductor pieces, and a plurality of push-button associating rods mounted on said insulating base plate respectively over said pairs of the conductor pieces, said plurality of the push-button associating rods each consisting of two projections mounted on both sides thereof, a short-circuit contact piece mounted on the inside of one of said projections for short-circuiting the pairs of the conductor pieces and short-circuit contact pieces mounted on the other projection for connecting the conductor pieces and the conductors adjacent thereto respectively, said push-button associating rods being arranged capable of being slid alternately.

No references cited.

HERMAN KARL SAALBACH, *Primary Examiner.*

R. F. HUNT, Jr., *Assistant Examiner.*